United States Patent
Sartore (10) Patent No.: US 6,223,266 B1
(45) Date of Patent: Apr. 24, 2001

(54) SYSTEM AND METHOD FOR INTERFACING AN INPUT/OUTPUT SYSTEM MEMORY TO A HOST COMPUTER SYSTEM MEMORY

(75) Inventor: Ronald H. Sartore, San Diego, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 08/914,960

(22) Filed: Aug. 20, 1997

(51) Int. Cl.[7] ............... G06F 12/00; G06F 13/38; G06F 13/40; G06F 13/00
(52) U.S. Cl. ............... 711/170; 711/171; 711/218; 710/129; 710/126; 710/128; 710/35; 710/29
(58) Field of Search ............... 711/118, 119, 711/120, 121, 123, 125, 126, 133, 135, 142, 143, 144, 170, 171, 218; 395/828, 831, 842, 284, 800.32, 800.27; 710/8, 11, 22, 104, 129, 29, 35, 126, 128; 284/800.32; 712/32

(56) References Cited

U.S. PATENT DOCUMENTS

| | | | |
|---|---|---|---|
| 5,045,996 | * 9/1991 | Barth et al. | 711/143 |
| 5,247,648 | * 9/1993 | Watkins et al. | 711/143 |
| 5,263,142 | * 11/1993 | Watkins et al. | 710/22 |
| 5,551,000 | * 8/1996 | Tan et al. | 711/118 |
| 5,761,721 | * 6/1998 | Baldus et al. | 711/141 |
| 5,838,935 | * 11/1998 | Davis et al. | 710/129 |
| 5,884,098 | * 3/1999 | Mason, Jr. | 710/52 |
| 5,897,667 | * 4/1999 | Miller et al. | 711/218 |
| 6,092,125 | * 7/2000 | Schindler | 710/35 |

* cited by examiner

Primary Examiner—Do Hyun Yoo
Assistant Examiner—Kimberly McLean
(74) Attorney, Agent, or Firm—Christopher P. Maiorana, P.C.

(57) ABSTRACT

A system and method for interfacing between an input/output system, that includes a local computer bus, a processor connected to the local computer bus and an interface to a computer system bus, and a computer system having a main memory is provided. The system includes a memory system with a memory controller that controls access and storage of data. The system may initiate sequential or burst ordered blocks of data over the computer bus from the computer system in anticipation of random access requests for data by the processor. A system and method for interfacing a plurality of processors to a computer system having a system bus and a main memory is also provided.

18 Claims, 6 Drawing Sheets

SYSTEM AND METHOD FOR INTERFACING AN INPUT/OUTPUT SYSTEM MEMORY TO A HOST COMPUTER SYSTEM MEMORY

BACKGROUND OF THE INVENTION

This invention relates generally to a system and method for interfacing systems within a computer system and in particular to a system and method for interfacing an input/output system to a host computer over a high speed computer bus.

Computer systems, and in particular, central processing units (CPUs) in the computer system require a certain amount of memory to store software application code, operating system code as well as data. During the operation of a typical computer system, the CPU executes the application code stored in the memory and stores and/or retrieves data from the memory. In addition to the memory, the CPU may also require additional hardware circuitry and memory to interface with different electrical computer buses which may have different purposes and different bus standards. These computer buses may connect input/output (I/O) systems and devices to the CPU, for example.

Some of these input/output devices may have a microprocessor or microcontroller located in the input/output device to process data being communicated to the input/output device to improve the speed or functionality of the I/O operations. Other devices may not, so the CPU in the computer system may have to process all of the input/output devices instructions and data as well as its own instructions and data. This can degrade the speed of the CPU. The performance of the input/output device is also slow because the instructions and data from the input/output device at times may have a lower priority than the CPU's own data and instructions. Some typical input/output devices may have some intelligence, such as a microcontroller or microprocessor so that instructions of the device can be executed, and data can be processed by the microprocessor located within the input/output device. Therefore, the speed of processing the instructions and data of the input/output device is not dependent on the speed of the CPU in the computer system. These input/output devices normally require a local memory for storing the software application code being executed by the microprocessor in the input/output device and the data operated on by the microprocessor. The additional memory in the input/output device increases its cost and increases its overall physical size requirements. It is often desirable that data transfers occur between the local memories for the input/output device and the main memory of the computer system.

Many system buses and memory devices are capable of high speed data transfers, such as block transfers, in which a block of sequential memory addresses is transferred. These high speed transfers are known as "burst" transfers since a sequential block of data may be rapidly transferred (e.g., bursted) to another memory location or another memory connected to the same computer bus. These burst transfers are very efficient for general bus operations (e.g., the transfer of commands and data from different units within a computer system), but cannot adequately serve a microprocessor executing software code because the software code is typically accessed from non-sequential memory locations within the memory and thus requires non-sequential accessing of the memory which is not compatible with the sequential memory address burst transfers over computer buses. The burst transfer of sequential memory addresses also does not adequately serve any other type of retrieval or processing of non-sequential data.

None of the known systems provides a general purpose, processor unspecific memory architecture which can take advantage of the high speed sequential data transfers possible with a computer bus while also serving as the main memory for a microprocessor in an input/output device which requires randomly accessible data. It is desirable to provide a memory architecture and system that can take advantage of high speed burst transfers over a high speed computer bus for input/output devices that require randomly accessible data.

Thus, there is a need for a system and method for improved, more efficient communication of data between an input/output device and a computer system over a high speed computer bus which avoids the foregoing and other problems of known systems and methods, and it is to this end that the present invention is directed.

SUMMARY OF THE INVENTION

In accordance with the invention, a system and method for interfacing an input/output system to a computer system having a local bus that connects to a microprocessor is provided in which the computer system and input/output system are connected by a high speed system bus. The interface system may interface the high speed system bus to a memory within the interface system and also interface the interface system to the local bus of the input/output system. Because the memory within the interface system is connected directly to the high speed system bus, the memory may communicate with the main memory of the computer system over the high speed computer bus to transfer burst ordered blocks of data into and out of the memory located within the interface system at high speed. The memory of the interface system may also act as the main memory for the processor in the input/output system and permit random access of data by the processor. More specifically, the interface system may include the bus interfaces, a cache memory, a cache controller, debugging aids and a shared memory. The coupled memory device may also be incorporated into a single semiconductor component or integrated circuit.

The invention may also provide a system for interfacing between a plurality of microprocessors connected to a high speed bus in which an interface device with a memory is connected to each microprocessor and each of the interface devices are in turn connected to the high speed system bus of the computer system. For each microprocessor, the memory in the interface device is connected to the high speed system bus and may communicate sequential or other burst ordered blocks of data with the computer system or with the other microprocessors over the high speed computer bus. The memory in the interface device may also act as a main memory for the microprocessor since the cache memory may permit the microprocessor to randomly access data in the memory.

The invention also provides a method for filling and updating a cache memory, such as in the coupled memory device, in which a least recently used age list of memory pages indicates that a memory page in the cache is older (i.e., not recently used) or newer (i.e., more recently used). Any missing cache lines in newer pages may be filled while any modified cache lines in older pages may be written back to main memory. In this method, the newest pages are always ready to be accessed while the oldest pages may be reused as needed.

The system and method may also provide a system for locking certain memory pages of the cache memory than contain time critical data for the processor so that these locked memory pages cannot be re-used until those memory pages are unlocked or unnailed. The system and method may also provide a system for removing certain memory pages from the cache memory regardless of their position in the least recently used stack so that these memory pages are re-used immediately once any modified cache lines have been written back into the main memory. In addition, a unique system and method for reading the requested data from the main memory is provided in which, during a first request, the actual requested data is read from the main memory directly to the I/O processor, and during a second request, an entire cache line of data including the requested data is loaded into the cache memory. Thus, the processor obtains the requested data as fast as possible and the accuracy of the data in the cache memory is maintained. A unique system and method for writing modified instruction data into the instruction cache is also provided in which the I/O processor may write modified instruction data to the cache memory, but the cache memory controller actually writes the modified cache line immediately into the main memory and resets the valid bit on the modified cache line in the cache memory so that, when the I/O processor next requests the instruction data in that modified cache line, the cache memory controller retrieves the instruction data from the main memory.

In accordance with the invention, a system and method for interfacing between a computer system and an input/output system is provided in which the computer system has a main memory connected to a computer system bus and the input/output system has a local input/output bus and an input/output processor connected to the local input/output bus. The interface system may connect the computer system bus to the interface system and also connect the interface system to the local input/output bus. The interface system may request a block of data, responsive to a data request by the input/output processor, from the main memory containing said requested data, and have a memory for storing the block of data transferred over said computer system bus. The interface system may also randomly access the requested data from the memory, responsive to the input/output processor's request.

In accordance with another aspect of the invention, a system and method for interfacing a plurality of processors to a computer system having a computer system bus and a main memory is provided having a plurality of memory systems, one memory system connected to each processor in which each memory system interfaces the memory system to the processor and the memory system to the computer system bus. The memory system may, responsive to a request for data by the processor, request a block of data from the main memory that is stored in a memory. The memory system may, responsive to a processor request, randomly retrieve the requested data stored in the memory.

DETAILED DESCRIPTION OF A PREFERRED EMBODIMENT

The invention is particularly applicable to a system and method for interfacing an input/output system that includes a microprocessor to a computer system with a high speed system bus. It is in this context that the invention will be described. It will be appreciated, however, that the system and method in accordance with the invention has greater utility. To more fully understand the invention, several examples of conventional systems for connecting an input/output system to a computer system will be described prior to describing the preferred embodiments of the invention.

Figure 1:
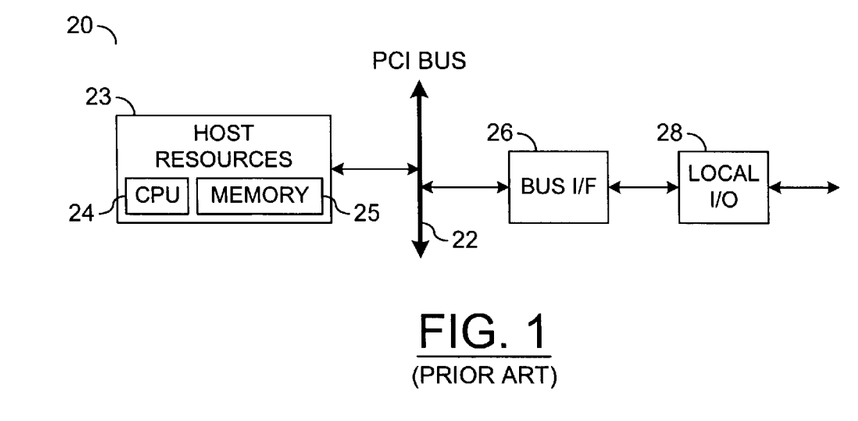
FIG. 1 is a diagram illustrating a conventional input/output system within a conventional computer system.

FIG. 1 is a diagram of a first conventional computer system 20 and a conventional I/O system connected to the computer system. The computer system 20 may include a computer system bus 22, that may be a high speed peripheral component interconnect (PCI) computer bus capable of efficient burst data transfer rates. The PCI bus is also connected to a host computer system 23 which may include a CPU 24 and a main memory 25. The PCI bus, as shown, is also connected to a bus interface (I/F) circuit 26 which is connected to a local input/output (I/O) system 28. Thus, data may be transferred over the PCI bus between the CPU and memory of the host system and the I/O system. In this example, the I/O system does not have its own microcontroller or microprocessor. This conventional system is relatively less expensive since no microprocessor is contained in the I/O system. This system, however, has several drawbacks. Any operations required by the I/O system must be performed by the main host CPU so that the performance of the I/O system is dependent on the host CPU's performance and the performance of the host CPU is dependent on the processing demands of the local I/O system. Other disadvantages of this system may include bus and processor latency concerns (e.g., lack of speed of the CPU or bus or response delays due to the service of other tasks or peripherals), bandwidth issues (e.g., not sufficient bandwidth to adequately service the local I/O system), interrupt responsiveness issues (e.g., how timely the CPU responds to interrupts generated by the I/O system), and bus width differences which may cause data width conversion inefficiencies. This I/O system does not have any ability to perform even simple processing functions. The ability to process data may be added to the conventional I/O system by incorporating a microcontroller or microprocessor into the I/O system as shown in FIG. 2.

Figure 2:
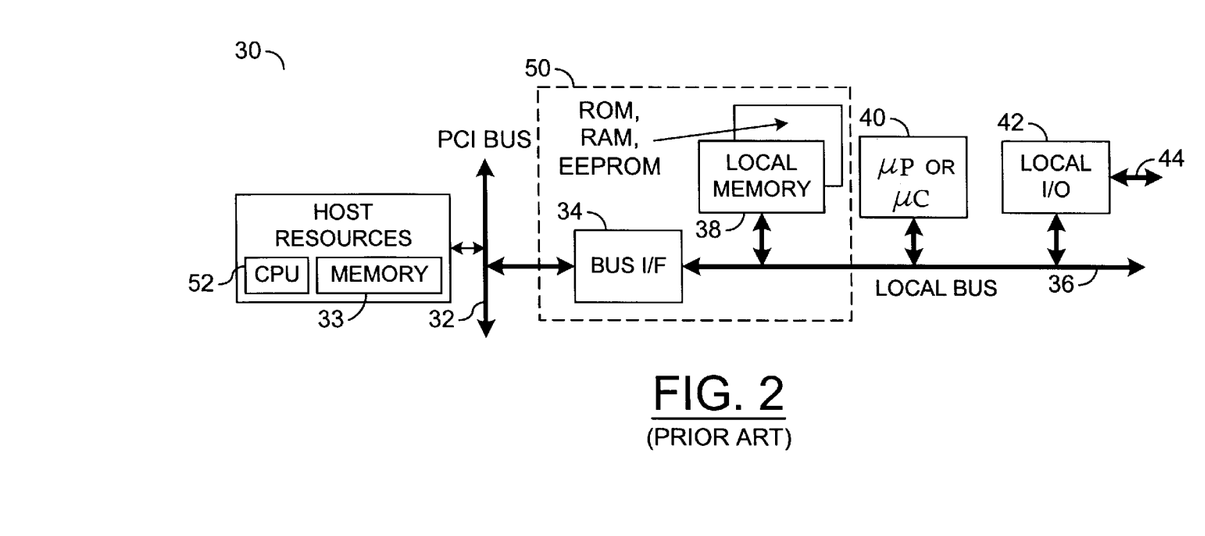
FIG. 2 is a diagram illustrating another conventional input/output system having a microprocessor.

FIG. 2 is a diagram illustrating another conventional computer system 30 including a computer system bus 32, such as a high speed PCI bus, that is connected to other systems within the computer system, such as the host CPU 33 and a main memory 52. The PCI bus is also connected to a bus interface (I/F) circuit 34 which is in turn connected to a local computer bus 36. The bus I/F circuit communicates data between the PCI bus and the local bus. The local bus is attached to an input/output (I/O) system that may include a local memory 38, that may include one or more read only memories (ROMs), one or more random access memories (RAM's), and one or more electrically erasable programmable read only memories (EEPROMs), a processing unit 40 that may be a microcontroller or a microprocessor, and a local I/O system 42 that may be connected to application specific input/output elements 44. The local memory 38 may store the software application code being executed by the processing unit 40 located on the I/O system. The processing unit may perform a plurality of different functions such that the performance of the host CPU is not degraded by the I/O system and the I/O system is not dependent on the host CPU for its performance. The local I/O system 42 permits the processor 40 of the I/O subsystem to perform input/output operations for the input/output elements 44. The bus interface 34 and local memory 38 may also be combined into a single semiconductor chip 50 to reduce the amount of board space occupied by the bus interface and the memory.

In operation, data between the host computer system and the local bus 36 passes through the bus interface 34. To access data from the main memory, the data travels from the main memory to the bus interface over the system bus, but then must additionally travel over the local bus to reach the local memory for possible further processing by the microprocessor. Thus, the speed of this conventional system is limited by the inefficient use and speed of the local bus. Although the input/output functions of the computer system are host independent (e.g., the input/output operations do not depend on the CPU in the host computer system) with this system, a dedicated input/output processor has a number of significant disadvantages. The input/output processor requires some amount of memory to store the application code being executed by the processor which greatly increases the cost and complexity of the system. In addition, the various choices of memory types, such as non-volatile read only memory (e.g., ROM) or a random access memory (RAM), and the associated different memory bus widths, such as eight, sixteen, twenty-four or thirty-two bits, the different widths of the memory devices, such as one, eight or sixteen bits, and the different memory technologies, such as static RAMs (SRAMs), dynamic RAMs (DRAMs), or non-volatile memories for example, make it more difficult to choose the appropriate memory and match the memory to the input/output processor. In addition, the memory selected must match the performance of the input/output processor. As a result of these problems and especially the need for local memory to support the I/O processor, the input/output processor choice becomes impractical or not price competitive with other solutions. In addition, as described above, the speed that data may be transferred from the main memory to the local memory and subsequently to the I/O microprocessor is less efficient due to the duplicate transfers involved (e.g., from the bus interface to the local memory and then from the local memory to the microprocessor).

In summary, the conventional systems described above have numerous disadvantages. The system shown in FIG. 1 is dependent on the processor in the computer system which degrades the speed of the processor and the speed of the I/O system. The system of FIG. 2 has an I/O processor, but the I/O processor introduces its own problems. In addition, neither conventional system can efficiently utilize the high speed burst transfer capability of the PCI bus and also function as a randomly accessible memory for the processor in the I/O system.

Therefore, it is desirable to provide a system and method for interfacing between a host computer system and an input/output system over a high speed computer system bus, in accordance with the invention, which takes advantage of the high speed burst data transfers of the PCI bus, but also functions as a random access main memory for a processor in the input/output system. A system and method in accordance with the invention which achieves these objectives will now be described with reference to FIG. 3.

Figure 3:
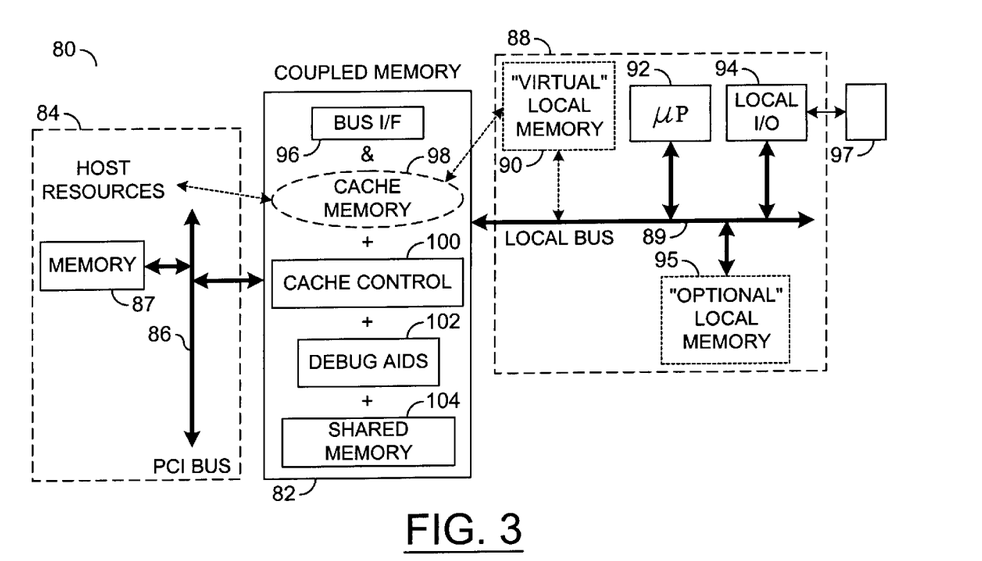
FIG. 3 is a diagram illustrating a first embodiment of a system and method for communicating data between an input/output system and a host computer system in accordance with the invention.

FIG. 3 is a diagram illustrating a computer system 80 in accordance with a first embodiment of the invention that may include an interface system 82 in accordance with the invention. The interface system may interface between a host computer system 84 having a high speed system bus 86 and an input/output (I/O) system 88. The interface system may store sequential or other burst ordered data communicated to the interface system by the computer system over the high speed computer bus 86 and may also serve as a randomly accessible main memory for a processor 92 located within the input/output system 88.

The computer system 80 may include the interface system 82 which interfaces between the host computer system 84 that may have various resources, such as a main memory 87 and the high speed computer system bus 86, such as, for example, a peripheral component interconnect (PCI) system bus that may transfer data rates of up to 132 megabytes per second. The interface system 82 may be connected to the input/output system 88 that may include a local I/O bus 89 which may connect a virtual local memory 90, a microprocessor 92, and a local I/O interface 94. The virtual local memory 90 is not an actual memory device. Instead it represents a mapping from physical memory locations within a memory 98 in the interface system 82 as shown by the dotted line so that the microprocessor may randomly access data in the memory 98 in the interface system. The local I/O interface may be connected to an input/output device 97. The input/output system 88 may also include an optional local memory 95, but a local memory is not required because the interface system can function as the entire local memory for the microprocessor of the I/O system. The functions of the microprocessor and the local I/O interface have been described above and will not be described here. The function of the virtual local memory that is performed by the memory in the interface system in accordance with the invention will now be described.

The interface system 82, as shown, is connected directly to the PCI system bus 86 so that the interface system may utilize the high speed burst transfers of the PCI bus to communicate data with the computer system. Thus, data from the main memory of the computer system may be transferred by a high speed PCI bus sequential or other burst ordered transfer directly to a memory within the interface system. The memory within the interface system in turn may be accessed by the microprocessor 92 of the I/O system 88 in a random access manner so that the interface system is the local memory for the microprocessor of the I/O system and the I/O system does not need a local memory. When the microprocessor requests data from the main memory, it may access that data directly from the interface system because the interface system will request the main memory data and it will be transferred over the high speed system bus. Now, more details about the interface system will be described.

The interface system 82, which may be incorporated into a single semiconductor chip, may include a bus interface 96, a cache memory 98, a cache memory controller 100, debug aids 102 and a shared memory 104. This interface system in accordance with the invention may be known as a coupled memory system as indicated in FIG. 3. The bus interface provides an interface between the coupled memory system and the PCI bus and between the coupled memory system and the local I/O bus. The cache memory may be rapid access rate semiconductor memories and may store data. The cache memory may request sequential or other burst ordered blocks of data from the computer system over the high speed PCI bus. The cache memory, upon a request by the microprocessor of the I/O system, may also communicate randomly accessed data on demand to the microprocessor of the input/output system.

The cache memory controller controls the communication of data between the cache memory, the main memory, and the I/O microprocessor, as described below, and controls the storage of the data within the cache memory. The cache memory controller may also control the cache memory page replacement technique as described below with reference to FIGS. 6 and 7. The cache memory controller may receive a request by the I/O microprocessor for data in the main memory of the computer system and the controller may determine either that the data is already located within the cache memory and may be communicated to the I/O microprocessor or that the data is not currently in the cache memory and will retrieve the data, using a high speed sequential or other burst ordered data transfer, over the PCI bus and communicate the data to the I/O microprocessor.

The debug aids may include various software routines which help to debug a software application program that may be stored in the cache memory of the coupled memory system because it is often difficult to debug software code that may be located within a cache memory. For example, the debug aids may consist of inserting debug options into an application and providing various reporting techniques, such as printouts to the screen or to a printer. The debug aids may include various hardware circuits which help to debug a software application program that may be stored in the cache memory of the coupled memory system. For example, the hardware debug aids may include a hardware address detection circuit for generating a break point or an event comparison and detection circuit. The shared memory may be a memory within the interface system which may be utilized differently from the cache memory. For example, any or all of the shared memory may be used to create a shared dual ported memory space so that the input/output system may use the shared memory in any manner needed. The shared memory may be dynamically changed to suit the needs of the input/output system and the I/O microprocessor.

The cache memory within the coupled memory system avoids the memory and PCI bus latency problems of conventional systems, such as those described above, since sequential or other burst ordered blocks of data may be transferred to the cache memory over the PCI bus and stored in the faster access cache memory so that the data does not need to be retrieved from the main memory. In addition, the cache memory within the coupled memory system addresses the needs associated with input/output processors such as the need for a local memory because the cache memory may provide for random memory accesses. To accomplish this, the size of the data that may be accessed from a cache line in the cache memory, as described below in more detail, may preferably be one byte. Thus, the cache memory will operate effectively with any input/output processor, including, for example, a digital signal processor (DSP), that may need to access single bytes of data. As described below, the cache memory controller may maintain the coherency of the cache memory with the main memory of the host computer system and the maintenance of the coherency between the memories operates in the background and does not affect the input/output processor. As described in more detail below, the cache memory may use two flags per cache line of the cache, such as a modified bit and a valid bit, to determine the most efficient manner both to load data into the cache memory from the host computer system memory via the PCI bus as well as write modified data in the cache memory back into the main memory.

The maintenance and update of the data in the cache memory and the replacement of pages within the cache memory may use a plurality of different maintenance or page replacement schemes, such as a most recently used page replacement scheme, a least frequently used page replacement scheme, a least processed first page replacement scheme, a first-in, first-out page replacement scheme or a last-in, first-out page replacement scheme. A preferred page replacement is a least recently used page replacement scheme as described below with reference to FIGS. 6 and 7. The cache memory also permits any of the pages of memory within the cache memory to be unswappable such that predictable execution of time critical code may be achieved when the input/output processes executes application code from those unswappable pages.

During the performance of an input/output system task, it is often necessary for the input/output system to communicate with the host computer processor or other systems within the host computer. When these communications occur by transferring data to and from the main memory, a particular location in the cache memory and the corresponding location in the main memory must be identical. To facilitate this coherency, the coupled memory system has various hardware and software methods for ensuring coherency, such as a bi-lateral method for generating interrupts so that the input/output system may generate a host computer processor interrupt or vice versa. The flow of data between the computer bus, the coupled memory and the input/output system in accordance with the invention will now be described.

Figure 4:
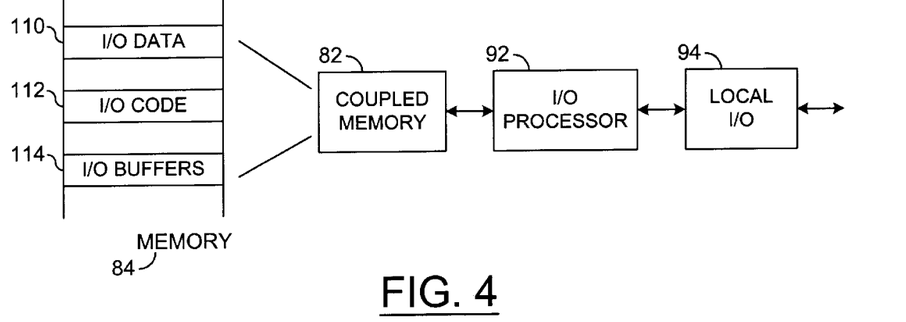
FIG. 4 is a diagram illustrating a flow of data between a computer bus, the coupled memory and an input/output system in accordance with the invention.

FIG. 4 is a diagram illustrating a flow of data between the host memory 84, the coupled memory 82 and the input/output processor 92 in accordance with the invention. In this example, input/output data 110, input/output code 112, and input/output buffers 114 may be stored in the host memory 84, also called the PCI memory. Thus, memory regions accessible by the PCI bus are also directly accessible, either cached or not, by the input/output processor 92 and data for the input/output system may be stored in the main memory and directed accessed over the PCI bus by the input/output system. The input/output system may also communicate with any other system attached to the PCI bus which may be accessed by the PCI bus. Thus, although the memory system is physically remote from the input/output processor 92 (e.g., connected through the PCI bus), they are functionally connected. The memory regions shown 110–114 may be of any size and may be dynamically resized as needed. For example, when an unusually large program is being executed, the input/output code region 112 may be enlarged to completely store the large program and then reduced in size during normal processing. Thus, the input/output system uses only as little or as much of the main memory as it needs at any time. Now, a second embodiment of a system and method for communicating data between the host computer and a input/output system in accordance with the invention will be described.

Figure 5:
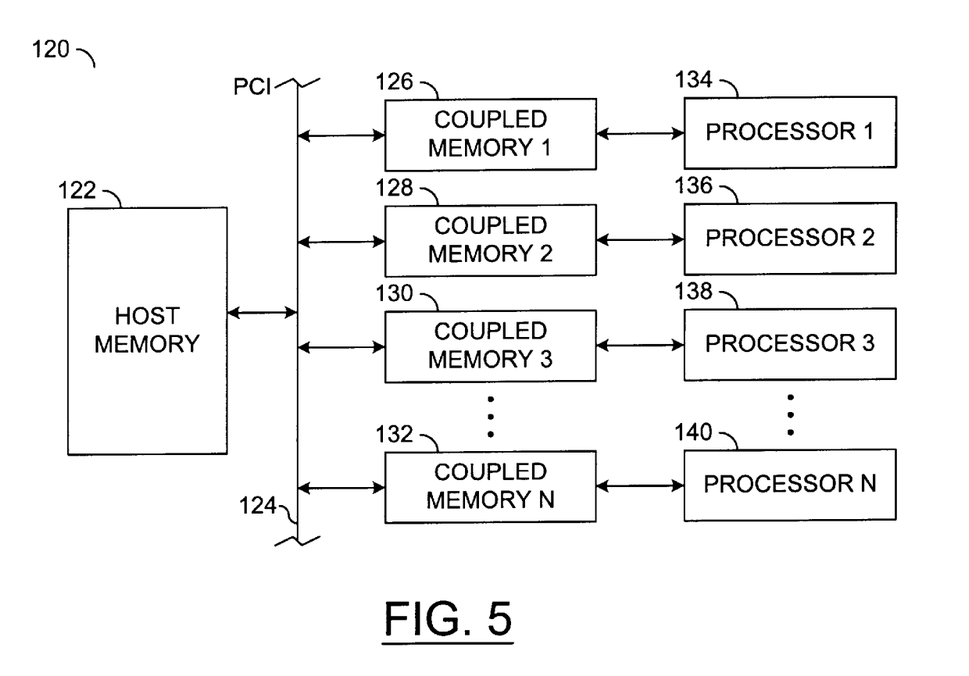
FIG. 5 is a diagram illustrating a second embodiment of a system and method for communicating data between a plurality of input/output processors and a host computer system in accordance with the invention.

FIG. 5 is a diagram illustrating a second embodiment of a computer system 120 in accordance with the invention. As will be described below, the advantage of this embodiment is that a plurality of different microprocessors may be connected together and data may be transferred between the microprocessor over a high speed computer system bus. The computer system 120 may have a plurality of coupled memory systems in accordance with the invention. As shown, a main host memory 122 may be connected to a high speed computer bus 124, such as a PCI bus. The PCI bus may also be connected to a plurality of coupled memory systems, such as a first coupled memory system 126, a second coupled memory system 128, a third coupled memory system 130 and an Nth coupled memory system 132, which are each in turn connected to a plurality of processors, such as a first processor 134, a second processor 136, a third processor 138 and an Nth processor 140. The processors may be identical or different (e.g., manufactured by a different manufacturer or using different technology). Each of the processors is connected to a coupled memory system which interfaces with a high speed system bus and the main memory of the computer system to enable the processor s to communicate data between each other as well as communicating data with the main memory. The main memory may also be distributed among the input/output processor systems.

As described above, the coupled memory system for each processor may communicate sequential or other burst ordered data over the PCI bus at high speed with the other coupled memory systems or with the main memory. In addition, each coupled memory system may act as a main memory for the processor to which it is attached. With the coupled memory systems, each processor may request data and the coupled memory system may load data from the main host memory into the cache memory over the high speed PCI bus. In addition, one processor may share data with another processor by transferring data from its coupled memory system to the coupled memory of the other processor over the PCI bus. For example, the first processor 134, which may be a Motorola processor, may have some data stored in its coupled memory system 126. The first processor may need to share that data with the third processor 138, which may be an Intel processor, and may transfer the data from its coupled memory 126 to the coupled memory 130 associated with the third processor 138 over the PCI bus. Thus, the coupled memory system may be used to connect a plurality of processors and to rapidly transfer data between a plurality of different processors that are all connected to a coupled memory system. Now, the details of the cache memory of the coupled memory system in accordance with the invention will be described.

Figure 6:
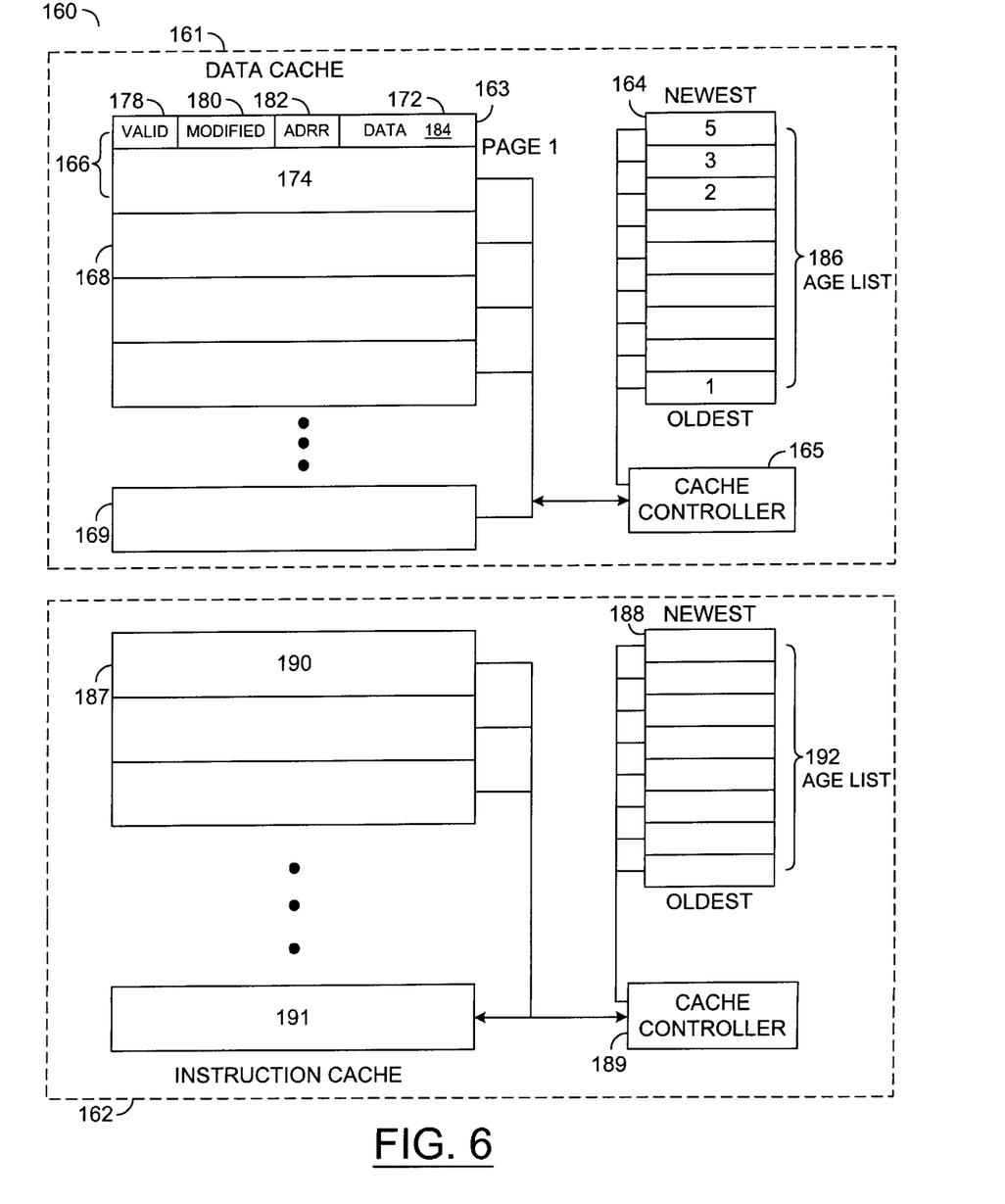
FIG. 6 is a diagram illustrating a cache memory and a cache memory filling and storing technique in accordance with the invention.

FIG. 6 illustrates a preferred arrangement of a cache memory system 160 and preferred cache memory page replacement scheme in accordance with the invention. Since the cache memory may be too small to contain all of the data in the main memory, new data that is requested by the microprocessor and should be present within the cache memory requires a replacement scheme that may, for example, replace the least recently used data by the newer data. The cache memory system 160 in accordance with the invention may include a data cache 161 for storing data accessed by the processor and an instruction cache 162 for storing instructions executed by the processor. The data cache and instruction cache are similar and a detailed description of only the data cache will be provided. The data cache further comprises a cache memory 163, an age list 164 and a cache controller 165. The cache controller controls the operation of the cache memory as well as the age list. The cache memory 163 may include a plurality of pages of memory, such as a first page 166, a second page 168 up to an Nth page 169, that contain copies of pages of memory in the host computer's main memory.

The instruction cache and the data cache may each be of any size. For example, each cache may be 8 Kbytes. The instruction cache and the data cache may each be divided into a plurality of memory pages. For example, the instruction cache may contain eight memory pages in which each memory page contains 1 Kbytes while the data cache may have sixteen memory pages in which each memory page contains 512 bytes of data.

When the processor connected to the cache memory attempts to access main memory, a page is selected in cache to hold a copy of the corresponding page in main memory. Each page in the cache may be further divided into a plurality of cache lines, such as a first and second cache line 172, 174 of the first page 166. The cache lines may be of any size, but may preferably be large enough to take advantage of the burst transfer capabilities of the PCI bus. For example, the cache lines may be 256 bits wide (e.g., 8 32-bit words). One byte of data may be retrieved from a cache line so that the coupled memory in accordance with the invention may be used for a plurality of different processors (e.g., 8-bit, 16-bit and 32-bit processors) with different bus widths. The cache is faster access memory than the main memory across the PCI bus and it is desirable to access the cache memory instead of the main memory. The cache controller maintains a map of main memory addresses to cache memory addresses so that the input/output processor will request an input/output processor address which is mapped to a main memory address by the cache controller and the cache controller may determine whether or not the data is in the cache and supply the appropriate data to the processor. Each cache line in the data cache contain data 184 and may have a valid bit 178 and a modified bit 180 associated with each cache line. Each page of the cache may have a base address associated with it (e.g., the starting address of the memory page) and each cache line may have an address 182 associated with it that is an offset from the page base address to the starting address of the cache line. The valid bit indicates that the data in the cache line have been loaded from the main memory, but does not indicate whether the data is identical to the main memory. The modified bit indicates whether the processor has modified some portion of that cache line (e.g., the cache line is not identical to the main memory) and that cache line needs to be written back into the main memory to maintain coherency between the cache memory and the main memory.

The age list 164 may contain a plurality of storage locations 186 containing a listing of the pages in the cache memory and the age list may be a least recently used (LRU) listing. Therefore, the pages listed at the top and upper portion of the age list are newer (e.g., the data in these pages have been used most recently and are likely to be used again soon) while the pages listed at the bottom or lower part of the age list are older (e.g., the data in these pages have been used least recently and are unlikely to be reused soon). In this example, the fifth page of the cache contains the newest data while the first page (page 0) contains the oldest data.

The instruction cache 162 may comprise an instruction cache memory 187, an age list 188 and a cache controller 189. The instruction cache memory may have a plurality of memory pages, such as a first memory page 190 and a last memory page 191 which have a plurality of cache lines as described above. The age list may comprises a plurality of storage locations 192 that may function in the same manner as the age list for the data cache. Each cache line in the instruction cache does not have a modified bit and the instruction cache cannot be modified by writing modified instruction data directly into the instruction cache. However, in accordance with the invention, a write around method for modifying data in the instruction cache is provided.

During the write around method, the I/O processor may modify some of the instruction data contained in the instruction cache. The instruction cache memory controller 89 may write the modified instruction data directly back into the main memory and reset the valid bit on the cache line in the instruction cache containing the modified instruction data. Thus, the next time that the I/O processor requests the modified instruction data, the instruction cache memory controller 89 fetches the modified instruction data from the main memory, sets the valid bit, and provides the modified instruction data to the I/O processor. In fetching the instruction data, the instruction cache controller 89 may also perform a fast fetch, as described below. In this manner, the instruction data in the instruction cache may be modified without actually modifying the instruction cache. Thus, although the modified bit of the instruction cache is missing, instruction data may be modified in the instruction cache in accordance with the invention.

The cache memory system may also retain or lock memory pages in the cache memory that contain time critical data so that these memory pages cannot be removed from the cache memory until they are unlocked. In addition, the data in certain memory pages in the cache memory may be removed or flushed at any time regardless of how recently that data was used by the input/output processor.

During the execution of instructions by the processor, when a new main memory address containing either data or an instruction is requested by the processor, the cache controller determines whether the requested data or instruction is currently in the data cache or the instruction cache and supplies the data or instruction to the input/output processor. If the data is already in the cache memory, then the cache simply provides the data to the input/output processor. The data or instruction may not be in its respective caches either because the cache line containing the data or instruction is empty (e.g., the memory page was in the cache, but the cache line was empty which is a page hit with an invalid cache line) or because the entire memory page is not in the cache which is known as a page miss. If the data or instruction is not within the cache, the cache controller assigns a cache memory page to the main memory page containing the requested data, a cache line size piece of data that contains the requested data is read into the assigned memory page, a valid bit is set for that cache line, and the requested data is supplied to the input/output processor. In a preferred embodiment, when data not in the cache is requested by the processor, a two step read process may occur which obtains the data for the processor as quickly as possible and also loads the data into the cache. In particular, first the actual data requested by the processor (e.g., 32 bits for a 32-bit processor) is read from the main memory and supplied to the processor directly and then, during a second data request, an entire cache line sized piece of data containing the requested data is read from the main memory into the cache memory.

Any subsequent accesses to that memory address or any other page in the cache will be a cache hit because the data is already present in the cache. The processor may randomly access data in the cache memory as needed, but data in the cache memory may be retrieved from the main memory over the high speed PCI bus. If the processor writes data into a cache line within a page, the modified bit for that page is set which indicates that that cache line needs to be written back into the main memory. The write back of data into the main memory may occur when either the cache has time to write them back or the page is needed to be re-used. The write back method will be described below in more detail.

For any input/output processor access into the cache (e.g., retrieval or write), the age list is updated so that the cache replacement method described below with reference to FIGS. 7 and 8 always has the most current information about which pages in the caches have been most recently accessed. The retrieval of data immediately needed by the input/output processor has the highest priority while the retrieving of missing cache lines from the main memory and the writing back of modified cache lines to the main memory have lower priority and occur whenever the cache is not retrieving data for the input/output processor. The method for retrieving missing cache lines and writing back modified cache lines will be described below with reference to FIG. 8. During typical operation, the cache may have some empty pages and a processor request for a new memory location may be assigned to one of the empty pages. When all of the pages are filled, however, the oldest page in the cache may be re-used which requires that any modified cache lines in the oldest page need to be written back into the main memory. It is desirable to ensure that the oldest pages do not have modified cache lines and that the newest pages do not have missing cache lines. Thus, a method for filling and storing data in the cache memory in accordance with the invention will now be described.

Figure 7:
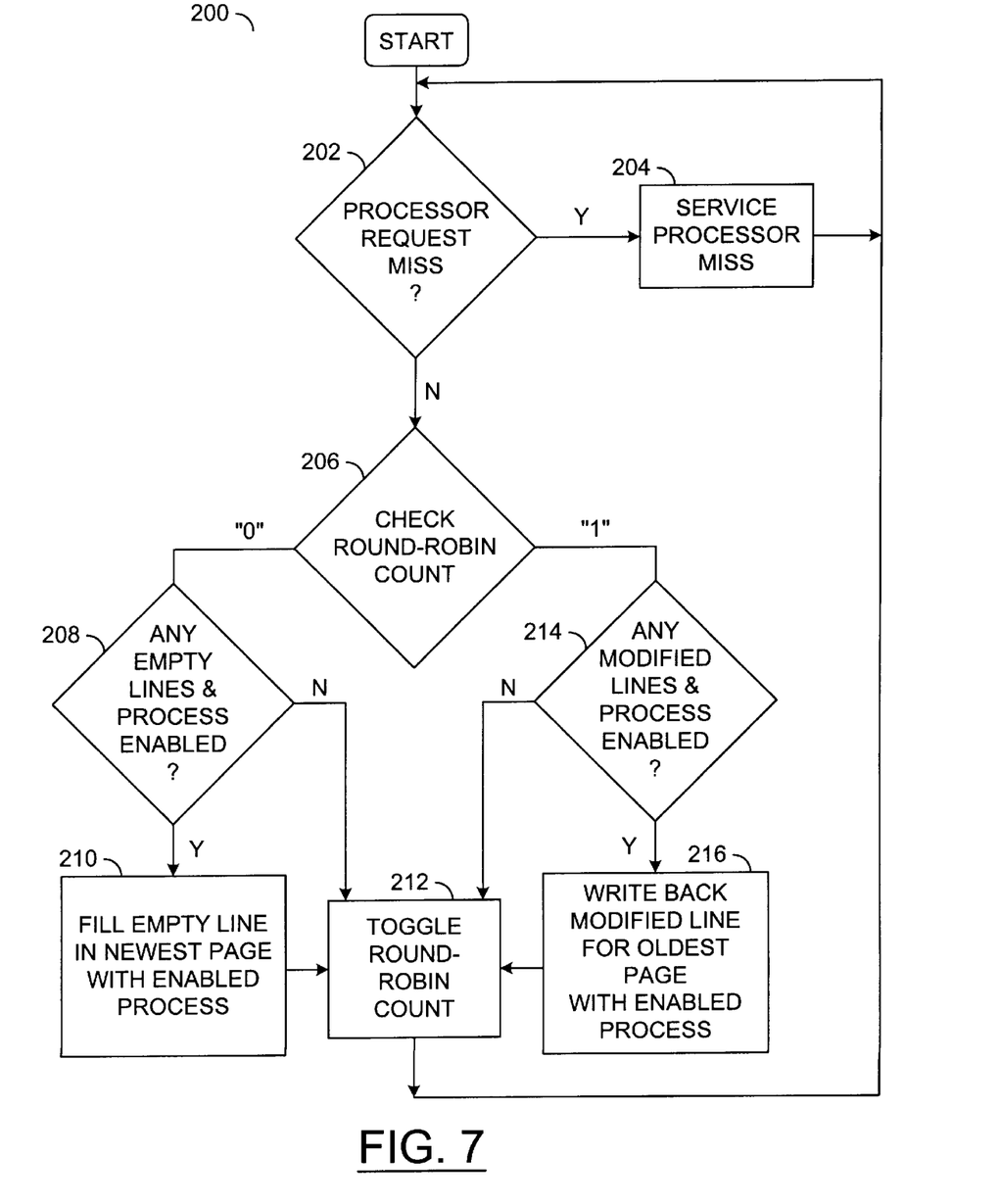
FIG. 7 is a flowchart illustrating a first embodiment of a method of filling and storing data in a cache memory in accordance with the invention.

FIG. 7 is a flowchart illustrating a first embodiment of a method 200 for replacing pages within a cache memory in accordance with the invention. In this embodiment, only a cache memory with a data cache is described, However, a method for replacing memory pages within a cache memory having a data cache and an instruction cache is described with reference to FIG. 8. Returning to FIG. 7, in step 202, the cache controller determines if there are any processor request misses (e.g., the data requested by the processor is not in the cache), and retrieves any data from the main memory and provides the data to the processor in step 204. Thus, the memory page replacement method operates in the background and a processor request for data always has priority over the replacement method. Thus. if there are not any processor request misses, in step 206, the system determines the current state of the round robin count which is a rotational priority scheme. The round robin count ensures that the retrieval of empty cache lines and the writing back of modified cache lines occurs in a fair manner. Thus, the round robin count rotates between "0" and "1" indicating either to retrieve empty cache lines or write back modified cache lines. If the round robin count is currently "0", then in step 208, the cache controller determines if the next newest page with an empty cache line is beyond a predetermined point in the age list so that the empty cache lines for pages are only filled for certain memory pages within the cache. For example, only memory pages that are above the predetermined point in the age list (e.g., newer memory pages) have their empty cache lines filled while memory pages below the predetermined point (e.g., older memory pages) never have their empty cache lines filled. If the newest memory page with an empty cache line is not below the predetermined point in the age list, then in step 210, the empty cache line of that memory page is filled. Once the empty cache line is filled or if the next newest page with a missing cache line is below the predetermined point in the age list, then in step 212, the round robin count is rotated to "1" so a write back operation may occur next time and the method loops back to step 202.

If the round robin count in step 206 is "1", then in step 214, the cache controller determines whether the next oldest page with a modified cache line is below a predetermined point in the age list (e.g., an older memory page) and writes back a modified cache line to the main memory if the next oldest page is below a predetermined point of the age list in step 216. After writing back the modified cache line or if the next oldest page with a modified cache line is above a predetermined point in the age list, then the round robin count is rotated in step 212 so that, the next time through the method, an empty cache line in a new memory page may be filled. The above-described method writes modified cache lines of older memory pages back to main memory and retrieves missing cache lines from newer memory pages efficiently so that fewer cache misses occur. Now, the method for the replacement of memory pages within a cache memory having a data cache and an instruction cache will be described.

Figure 8:
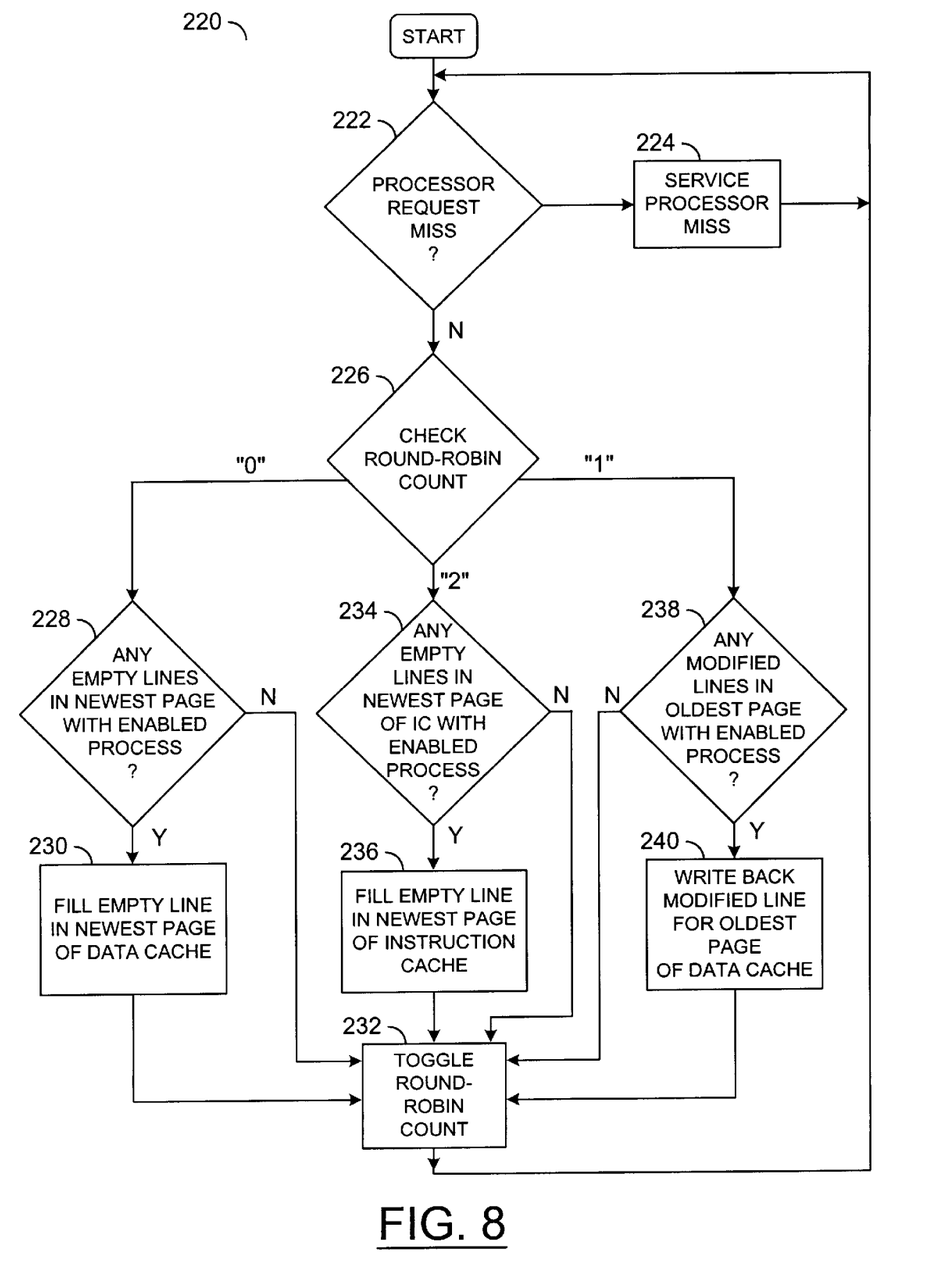
FIG. 8 is a flowchart illustrating a second embodiment of a method of filling and storing data in a cache memory in accordance with the invention.

FIG. 8 is a flowchart illustrating a second embodiment of a method 220 for replacing pages within a cache memory having a data cache and an instruction cache in accordance with the invention. In step 222, the cache controller determines if there are any processor request misses (e.g., the data requested by the processor is not in the cache), and retrieves any data from the main memory and provides the data to the processor in step 224. Thus, the memory page replacement method operates in the background and a processor request for data always has priority over the replacement method. Thus. if there are not any processor request misses, in step 226, the system determines the current state of the round robin count. The round robin count is a rotational priority scheme which ensures that the retrieval of empty cache lines for memory pages in the data cache, the writing back of modified cache lines for memory pages in the data cache, and the retrieval of empty cache lines for memory pages in the instruction cache occur in a fair manner. Thus, the round robin count rotates between "0", "1", and "2" indicating either to retrieve empty cache lines in the data cache or write back modified cache lines in the data cache or retrieve empty cache lines in the instruction cache. As described above, the instruction cache does not have modified cache lines since the processor does not modify the cache lines directly in the instruction cache memory, but instead uses the write around method described above.

If the round robin count is currently "0", then in step 228, the cache controller determines if the next newest page with an empty cache line in the data cache is beyond a predetermined point in the data cache age list so that the empty cache lines for pages are only filled for certain memory pages within the data cache. For example, only memory pages that are above the predetermined point in the age list (e.g., newer memory pages) have their empty cache lines filled while memory pages below the predetermined point (e.g., older memory pages) never have their empty cache lines filled. If the newest memory page with an empty cache line in the data cache is not below the predetermined point in the age list, then in step 230, the empty cache line of that memory page is filled. Once the empty cache line is filled or if the next newest page with a missing cache line is below the predetermined point in the age list, then in step 232, the round robin count is rotated to "1" so that a write back operation may occur next time and the method loops back to step 222.

If the round robin count in step 226 is "1", then in step 238, the cache controller determines whether the next oldest page with a modified cache line in the data cache is below a predetermined point in the age list (e.g., an older memory page) and writes back a modified cache line to the main memory if the next oldest page is below a predetermined point of the age list in step 240. After writing back the modified cache line or if the next oldest page with a modified cache line is above a predetermined point in the age list, then the round robin count is rotated to "2" in step 232 so that, the next time through the method, an empty cache line in a newer memory page of the instruction cache may be filled.

If the round robin count is currently "2", then in step 234, the cache controller determines if the next newest page with an empty cache line in the instruction cache is beyond a predetermined point in the instruction cache age list so that the empty cache lines for pages are only filled for certain memory pages within the instruction cache. For example, only memory pages that are above the predetermined point in the age list (e.g., newer memory pages) have their empty cache lines filled while memory pages below the predetermined point (e.g., older memory pages) never have their empty cache lines filled. If the newest memory page with an empty cache line in the instruction cache is not below the predetermined point in the age list, then in step 236, the empty cache line of that memory page is filled. Once the empty cache line is filled or if the next newest page with a missing cache line is below the predetermined point in the age list, then in step 232, the round robin count is rotated to "0" so that the retrieval of an empty cache line for a memory page within the data cache may occur next time and the method loops back to step 222. As above, this replacement method permits all of the different replacement operations to perform their operations.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A system comprising:
   an input/output system comprising (i) a local input/output bus and (ii) an input/output processor connected to the local input/output bus; and
   an interface memory configured to sequentially store one or more blocks of data from a main memory over a Peripheral Component Interface (PCI) bus, wherein said input/output system is configured to randomly access said one or more blocks of data stored in the interface memory by the input/output processor over said local input/output bus, said interface memory includes a memory portion that is dynamically reconfigured in response to a request from the input/output processor.

2. The system of claim 1, wherein said interface memory comprises a cache memory having a plurality of memory pages, each memory page having a plurality of memory cache lines configured to store said one or more blocks of data, wherein each of said one or more blocks of data comprises a cache line.

3. The system of claim 2, further configured to operate (i) when said input/output processor is not requesting data and (ii) when said input/output processor is requesting data already in the cache memory, wherein the data contained in the cache memory comprises (i) data missing from a memory page already in the cache memory from the main memory and (ii) data modified by the input/output processor back into the main memory.

4. The system of claim 2, wherein said cache memory is configured to write back the data contained in one of said plurality of memory pages regardless of the location of the one memory page.

5. The system of claim 1, wherein said input/output system and said interface memory are fabricated on a single substrate.

6. The system of claim 1, wherein said request from the input/output processor comprises either (i) a request for data from the main memory to provide said data to the input/output processor or (ii) a request for a cache line containing said requested data from the main memory.

7. The system according to claim 1, further comprising:
   a plurality of said input/output systems each comprising (i) a local input/output bus, (ii) an input/output processor connected to the local input/output bus and (iii) an interface memory connected to said PCI bus, wherein a computer bus is configured to couple said plurality of input/output systems.

8. The system of claim 7, wherein said system is further configured to sequentially transfer data (i) between said main memory and one or more of said interface memories or (ii) between two or more of said interface memories over the PCI bus.

9. A method for interfacing between an input/output system and a computer system having a main memory comprising the steps of:
   (A) receiving a request for data from said input/output system having a local input/output bus and an input/output processor connected to the local input/output bus;
   (B) sequentially retrieving and storing one or more blocks of data from the main memory over a Peripheral Component Interconnect (PCI) bus to a second memory in response to the data request by the input/output processor; and
   (C) randomly accessing said requested data stored in the second memory by the input/output processor over said local input/output bus and dynamically reconfiguring a memory portion of the second memory in response to said request by the input/output processor.

10. The method of claim 9, wherein step (C) further comprises storing data in a cache memory having a plurality of memory pages, each memory page having a plurality of memory cache lines, wherein each of said one or more blocks of data comprises a cache line of data.

11. The method of claim 10, wherein step (C) further comprises updating the data contained in the cache memory when said input/output processor (i) is not requesting data and (ii) when said input/output processor is requesting data already in the cache memory, the updating comprises (i) retrieving data missing from a memory page already in the cache memory from the main memory and (ii) writing data modified by the input/output processor back into the main memory.

12. The method of claim 11, wherein step (C) comprises replacing a first memory page of the plurality of memory pages of the cache memory in response to said request for data from said input/output processor with a second memory page containing data.

13. The method of claim 12, wherein step (C) comprises (i) locking said first memory page so that the first memory page is not replaced in the cache memory and (ii) accessing data contained in the first memory page at any time.

14. The method of claim 10 further comprising the step of:
   writing back the data contained in one of said plurality of memory pages in the cache memory regardless of the location of the memory page in a stack.

15. The method of claim 9, wherein said data requested by said input/output processor comprises (i) one or more instructions to be executed by said input/output processor and (ii) one or more data portions operated on by said input/output processor.

16. The method according to claim 9, wherein said method further comprises a plurality of said input/output systems each comprising (i) a local input/output bus, (ii) an input/output processor and (iii) a plurality of second memories, said method comprising allowing said plurality of input/output systems to communicate through a computer bus.

17. The method of claim 16, wherein said method further comprises sequentially transferring data (i) between said main memory and one or more of said second memories or (ii) between two or more of said second memories over the PCI bus.

18. A system comprising:
   means for inputting/outputting comprising (i) a local input/output bus and (ii) an input/output processor connected to the local input/output bus; and
   means for sequentially retrieving and storing one or more blocks of data from a main memory over a PCI bus, wherein said inputting/outputting means randomly accesses said one or more blocks of data stored in the retrieving means by the input/output processor over said local input/output bus, wherein said retrieving and storing means includes a memory portion that is dynamically reconfigured in response to a request from said inputting/outputting means.

* * * * *